(12) United States Patent
Sato et al.

(10) Patent No.: US 6,646,417 B2
(45) Date of Patent: Nov. 11, 2003

(54) CHARGER AND ELECTRICAL APPARATUS

(75) Inventors: Koichi Sato, Yamagata (JP); Yoshinao Kato, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 0 days.

(21) Appl. No.: 10/303,900

(22) Filed: Nov. 26, 2002

(65) Prior Publication Data

US 2003/0102843 A1 Jun. 5, 2003

(30) Foreign Application Priority Data

Dec. 4, 2001 (JP) ........................................ 2001-369605

(51) Int. Cl.[7] ................................................. H02J 7/00
(52) U.S. Cl. ....................................... 320/116; 320/128
(58) Field of Search ................................ 320/116, 117, 320/120, 126, 128; 429/96, 97, 98, 99, 100

(56) References Cited

U.S. PATENT DOCUMENTS 5,517,277 A * 5/1996 Goto et al. .................. 354/484

FOREIGN PATENT DOCUMENTS

| JP | 3-53571 | | 3/1991 |
|---|---|---|---|
| JP | 3-053571 | * | 3/1991 |
| JP | UM-BV-3-053571 | * | 7/1997 |

* cited by examiner

Primary Examiner—Lawrence Luk
(74) Attorney, Agent, or Firm—Sughrue Mion, PLLC

(57) ABSTRACT

A battery holding portion holds the plurality of secondary batteries in series connection to a charging power source. The power supply to the secondary batteries in series connection is turned on or off by a switching circuit. A control terminal of the switching circuit is connected to a chassis exposure part of one secondary battery, the chassis exposure parts of other secondary batteries being connected to the reference voltage of the charging power source. When the primary battery is mounted, the switching circuit is turned off, because no current path from the charging power source through the plurality of secondary batteries to the reference voltage is established, whereby the batteries are not charged. Hence, it is possible to prevent the charging for the primary battery.

6 Claims, 1 Drawing Sheet

CHARGER AND ELECTRICAL APPARATUS

CROSS REFERENCE OF RELATED APPLICATION

This application is based on and claims priority under 35 U.S.C. §119 with respect to Japanese Patent Application No. 2001-369605 filed on Dec. 4, 2001, the entire content of which is incorporated herein by reference.

BACKGROUND OF THE INVENTION

1. Field of the Invention

The present invention relates to a charger with an improper charging prevention function to be useful for an electrical apparatus.

2. Description of the Related Art

The conventional electrical apparatus uses a primary battery (dry element battery) and a secondary battery (battery accumulator) and is chargeable with an external charger while the secondary battery is mounted.

However, this sort of electrical apparatus has no function of discriminating whether the mounted battery is a primary or secondary battery, whereby it may occur that the electrical apparatus is charged by mistake while the primary battery is mounted. The primary battery gives rise to a phenomenon such as leakage of liquid or rupture when there is a large charging current at the time of charging, resulting in a problem of damaging the electrical apparatus.

To solve this problem, there is a charging circuit as shown in FIG. 2. In FIG. 2, a charging voltage is applied between a charging power source (+B) and a charging ground (GND). Two secondary batteries are connected in series within a case 107. The plus terminal of the batteries in series connection is connected to the charging power source, and a chassis exposure part is connected to the charging ground. Between the charging power source and the charging ground, a load circuit 103 is connected in parallel with the batteries in series connection.

A secondary battery 102 in series connection has a chassis exposure part 105 externally. Hence, the batteries in series connection and the load circuit are connected to the ground through the chassis exposure part 105 of the secondary battery 102, establishing a current path from the charging power source to the charging ground to charge two batteries.

Herein, if a primary battery is placed by mistake, instead of the secondary battery 102, two batteries are not connected to the charging ground, because the primary battery is not formed with the chassis exposure part outside. Consequently, the batteries are not charged as a result of no establishment of current path from the charging power source to the charging ground. In this manner, it is possible to prevent the charging when the primary battery is placed by mistake.

A similar charging circuit was described in Japanese Registered Utility Model Publication Hei. 3-53571. In the charging circuit of this patent, a case for accommodating two batteries is used in the same way as above, and the charging circuit is activated by electrically detecting the presence of the chassis exposure part exposed outside the case. Namely, using a switching transistor, a detecting circuit turns on the switching transistor, if the chassis exposure part is present, whereby the charging circuit is turned on or off to prevent the charging when the primary battery is placed by mistake.

However, in the above charging circuit, the case for accommodating the batteries must be longer to impose some constraints on the shape of case. When the battery placed inside the case is the primary battery, it can not be detected. That is, in an example of FIG. 2, when the primary battery is mounted as the battery 102, the battery is not electrically connected to the charging ground, because the primary battery has no chassis exposure part, so that the charging is not made, but when the primary battery is mounted by mistake as the battery 101, there is a problem that the charging is made.

SUMMARY OF THE INVENTION

The present invention has been achieved in the light of the above-mentioned problems, and it is an object of the invention to provide a charger which can prevent the charging, when any of a plurality of batteries mounted is the primary battery.

According to one aspect of the present invention, there is provided a charger for charging a plurality of secondary batteries, comprising a battery holding portion for holding the plurality of secondary batteries in series connection to a charging power source, and a switching circuit for turning on or off the power supply to the plurality of secondary batteries in series connection from the charging power source, based on a signal to a control terminal, wherein the control terminal of the switching circuit is connected to a chassis exposure part of one secondary battery, the chassis exposure parts of other secondary batteries being connected to a reference voltage of the charging power source.

With the above charger, the battery holding portion holds the plurality of secondary batteries in series connection to the charging power source. Also, the power supply to the secondary batteries in series connection is turned on or off by the switching circuit. The control terminal of the switching circuit is connected to the chassis exposure part of one secondary battery, the chassis exposure parts of other secondary batteries being connected to the reference voltage of the charging power source.

When the secondary batteries are mounted in the battery holding portion, the plurality of secondary batteries are connected in series between the charging power source and its reference voltage, because the secondary battery is formed with the chassis exposure part, thereby establishing a current path from the charging power source through the plurality of secondary batteries to the reference voltage. A control voltage is supplied to the control terminal of the switching circuit, so that the switching circuit is turned on to pass a charging current through the plurality of secondary batteries. In this way, the plurality of secondary batteries are charged.

On one hand, when the primary battery is mounted in the battery holding portion, the switching circuit is turned off, because no current path from the charging power source through the plurality of secondary batteries to the reference voltage is established, whereby the batteries are not charged. Hence, it is possible to prevent the charging for the primary battery.

In one form of the above charger, the battery holding portion is a case for accommodating each of the secondary batteries in a state where the plus terminal and the chassis exposure part are exposed outside.

In this form, if the batteries are mounted inside the case, the chassis exposure parts are exposed outside, and connected to the control terminal of the switching circuit and the reference voltage of the charging power source. The chassis exposure part is formed on the outer circumference of the secondary battery, and conducts to the minus terminal of the secondary battery.

In another form of the above charger, the switching circuit is a switching transistor, and the base of the switching transistor is connected to the chassis exposure part of the one secondary battery as the control terminal.

In this form, the switching circuit can be configured, employing the switching transistor.

In still another form of the above charger, the charger further comprises a load circuit connected in parallel to the plurality of secondary batteries in series connection.

In this still another form, the secondary batteries are mounted in the battery holding portion, and the load circuit can be driven while charging. When the primary battery is mounted in the battery holding portion, the charging is not made, but the load circuit can be also driven using the primary battery.

An electrical apparatus can be equipped with the above charger.

DETAILED DESCRIPTION OF THE PREFERRED EMBODIMENTS

Now, the preferred embodiments of the present invention will be described below with reference to the accompanying drawings.

Figure 1:
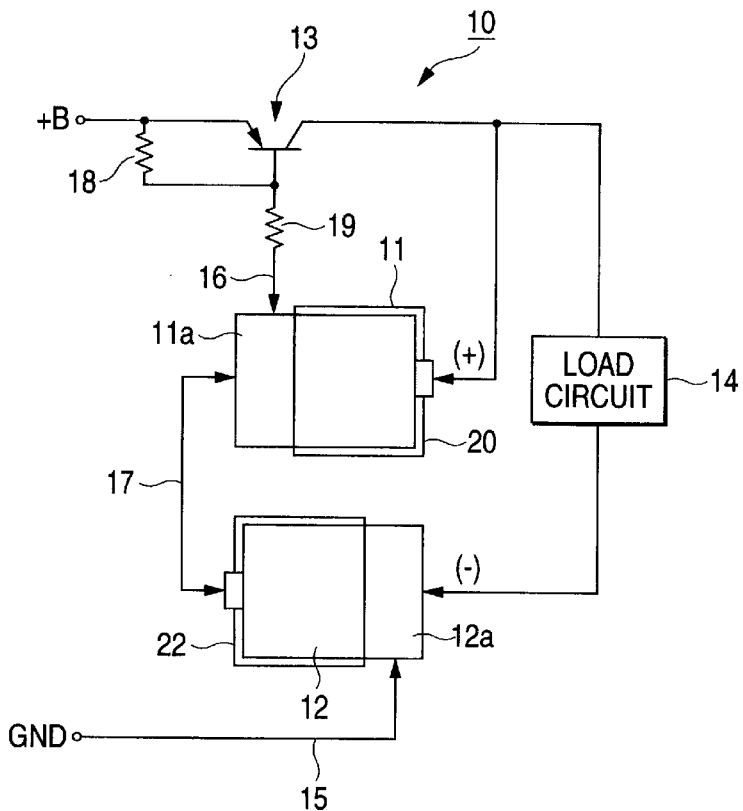
FIG. 1 is a block diagram of a charging circuit according to the present invention.
Figure 2:
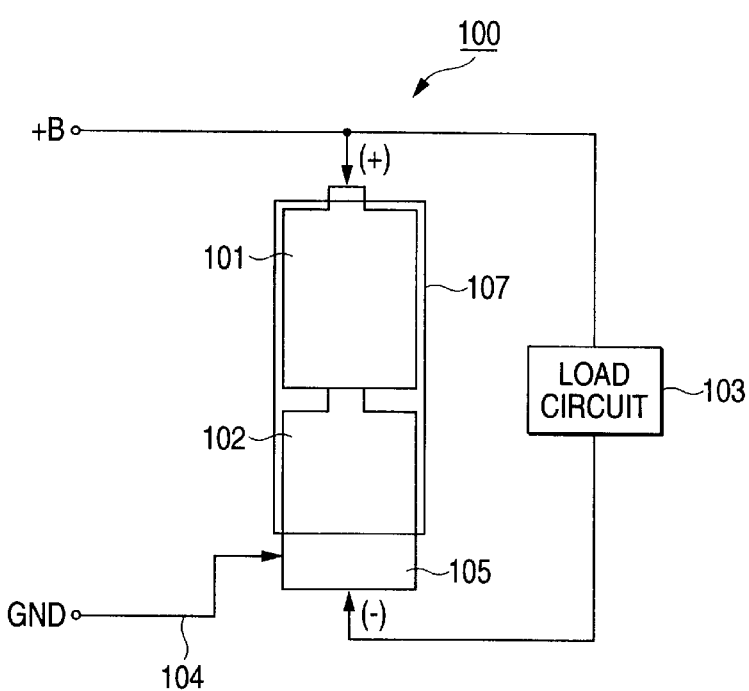
FIG. 2 is a block diagram of one example of the conventional changing circuit.

FIG. 1 is a block diagram of a charging circuit according to an embodiment of the present invention. In FIG. 1, a charging circuit 10 comprises two secondary batteries (dry element batteries) 11 and 12, a switching transistor 13, a load circuit, a bypass terminal 17, and the discriminating terminals 15 and 16.

A charging power source (+B) is connected to the emitter of the switching transistor 13, and connected via a resistor 18 to the base of the switching transistor 13. The base of the switching transistor 13 is connected via a resistor 19 and a detecting terminal 16 to a chassis exposure part 11a of battery 11. Also, the collector of the switching transistor 13 is connected to the plus terminal of secondary battery 11 and the load circuit 14.

This charging circuit is applicable to a cordless headphone, for example, in which case the load circuit 14 may be a receiver.

The secondary battery 11 has the plus terminal and the chassis exposure part 11a exposed outside the case 20, when mounted within the case 20. The minus terminal of secondary terminal 11 is connected via the bypass terminal 17 to the plus terminal of secondary battery 12. The secondary battery 12 is also accommodated within the case 22, the plus terminal and the chassis exposure part 12a being exposed outside the case 22. The minus terminal of secondary battery 12 is connected to the load circuit 14. Also, the chassis exposure part 12a of secondary battery 12 is connected via the detection terminal 15 to the charging ground (GND).

Consequently, two secondary batteries 11 and 12 are connected in series between the charging power source and the charging ground, and the load circuit 14 is provided in parallel to the secondary batteries 11 and 12.

The operation of the charging circuit 10 will be described below.

(1) Secondary Batteries 11 and 12

First of all, when the batteries 11 and 12 are secondary batteries, the discrimination terminal 16 conducts to the minus terminal of battery 11 via the chassis exposure part 11a. Also, the discriminating terminal 15 conducts to the minus terminal of battery 12 via the chassis exposure part 12a. Consequently, a current path from the charging power source via the resistor 19, the bypass terminal 17 and the battery 12 to the charging ground is established, and a control voltage is applied to the base of the switching transistor 13, so that the switching transistor is turned on. As a result, an electric current flows from the charging power source through the batteries 11 and 12 in series connection to the charging ground to charge the batteries 11 and 12.

Since the load circuit 14 is connected in parallel to the path from the charging power source to the charging ground, the load can be driven while charging. When the load circuit 14 is the receiver as previously described, the voice signal can be reproduced while charging.

(2) When at Least One of Batteries 11 and 12 is Primary Battery

In this case, at least one of the batteries 11 and 12 is not provided with the chassis exposure part, whereby the base of the switching transistor is not connected to the charging ground. Hence, the switching transistor is turned off, whereby the charging is not performed by the charging power source.

The batteries 11 and 12 are connected in series, while the load circuit 14 is connected in parallel. The load circuit 14 can be driven, by the batteries 11 and 12. Hence, the load circuit 14 can be driven, employing two primary batteries, but when at least one is the primary battery, the charging function does not work, so that the charging is prevented.

As described above, in this invention, when at least one battery is the primary battery, the charging circuit does not work, thereby preventing the charging. On the other hand, in this case, the load circuit can be also driven using the primary battery. When the secondary battery is used, the load circuit can be driven while the battery is being charged from the charging power source, because the load circuit is connected in parallel to the battery to be charged.

What is claimed is:

1. A charger for charging a plurality of secondary batteries, comprising:
   a battery holding portion for holding said plurality of secondary batteries in series connection to a charging power source; and
   a switching circuit for turning on or off the power supply to said plurality of secondary batteries in series connection from said charging power source, based on a signal to a control terminal,
   wherein said control terminal of said switching circuit is connected to a chassis exposure part of one secondary battery, the chassis exposure part of another secondary battery being connected to a reference voltage of said charging power source.

2. The charger according to claim 1, wherein said battery holding portion is a case for accommodating each of said secondary batteries in a state where the plus terminal and the chassis exposure part are exposed outside.

3. The charger according to claim 1, wherein said chassis exposure part is formed on the outer circumference of said secondary battery, and conducts to the minus terminal of said secondary battery.

4. The charger according to claim 1, wherein said switching circuit is a switching transistor, and the base of said switching transistor is connected to the chassis exposure part of said one secondary battery as said control terminal.

5. The charger according to claim 1, further comprising a load circuit connected in parallel to said plurality of secondary batteries in series connection.

6. An electrical apparatus comprising the charger according to any one of claims 1 to 5.

* * * * *